United States Patent
Hirose et al.

(10) Patent No.: US 6,501,527 B1
(45) Date of Patent: Dec. 31, 2002

(54) LIQUID CRYSTAL ELEMENTAL DEVICE, PRODUCTION PROCESS THEREOF AND SPACER-BEARING SUBSTRATE

(75) Inventors: Masashi Hirose, Machida (JP); Katsuhiro Shirota, Kawasaki (JP); Takeshi Miyazaki, Yokohama (JP); Akio Kashiwazaki, Yokohama (JP); Koichiro Nakazawa, Yokohama (JP); Yoshihisa Yamashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 09/624,379

(22) Filed: Jul. 27, 2000

(30) Foreign Application Priority Data

| Jul. 29, 1999 | (JP) | 11-214811 |
| Sep. 9, 1999 | (JP) | 11-255099 |
| Sep. 13, 1999 | (JP) | 11-259435 |
| Oct. 7, 1999 | (JP) | 11-286158 |
| Oct. 18, 1999 | (JP) | 11-295517 |

(51) Int. Cl.[7] .......................................... G02F 1/1339
(52) U.S. Cl. ............................................... 349/155
(58) Field of Search ........................... 349/153, 157; 430/7

(56) References Cited

U.S. PATENT DOCUMENTS

| 4,313,124 A | 1/1982 | Hara .......................... 346/140 |
| 4,345,262 A | 8/1982 | Shirato et al. ............... 346/140 |
| 4,459,600 A | 7/1984 | Sato et al. ................... 346/140 |
| 4,463,359 A | 7/1984 | Ayata et al. ................. 346/1.1 |
| 4,558,333 A | 12/1985 | Sugitani et al. .............. 346/140 |
| 4,723,129 A | 2/1988 | Endo et al. .................. 346/1.1 |
| 4,740,796 A | 4/1988 | Endo et al. .................. 346/1.1 |
| 4,744,639 A * | 5/1988 | Tsuboyama ............. 350/350 S |
| 5,681,675 A | 10/1997 | Kurauchi et al. ............. 430/20 |
| 5,712,064 A | 1/1998 | Miyazaki et al. .............. 430/7 |
| 5,716,740 A | 2/1998 | Shiba et al. ................... 430/7 |
| 5,726,724 A | 3/1998 | Shirota et al. ............... 349/106 |
| 5,736,278 A | 4/1998 | Nakazawa et al. ............. 430/7 |
| 5,757,451 A * | 5/1998 | Miyazaki et al. ........... 349/106 |
| 5,948,576 A | 9/1999 | Shirato et al. .................. 430/7 |
| 5,948,577 A | 9/1999 | Nakazawa et al. ............. 430/7 |
| 6,094,247 A | 1/2000 | Miyazaki et al. ........... 349/110 |
| 6,022,647 A | 2/2000 | Hirose et al. .................. 430/7 |
| 6,043,857 A | 3/2000 | Kurauchi et al. ........... 349/106 |
| 6,120,943 A | 9/2000 | Kurauchi et al. .............. 430/7 |
| 6,147,729 A | 11/2000 | Kurauchi et al. ........... 349/106 |
| 6,323,921 B1 | 11/2001 | Kurauchi et al. ........... 349/106 |

FOREIGN PATENT DOCUMENTS

| JP | 59-123670 | 7/1984 |
| JP | 59-138461 | 8/1984 |
| JP | 61-173221 | 8/1986 |
| JP | 63-82405 | 4/1988 |
| JP | 63-237032 | 10/1988 |
| JP | 2-223922 | 9/1990 |
| JP | 03-094230 | 4/1991 |
| JP | 03-184022 | 8/1991 |
| JP | 04-122914 | 4/1992 |
| JP | 8-36173 | 2/1996 |
| JP | 10-133191 | 5/1998 |
| JP | 11-007028 | * 1/1999 |
| KR | 033185 | 7/1998 |
| KR | 0171230 | 3/1999 |

* cited by examiner

Primary Examiner—Toan Ton
Assistant Examiner—Timothy L. Rude
(74) Attorney, Agent, or Firm—Fitzpatrick, Cella, Harper & Scinto

(57) ABSTRACT

A liquid crystal elemental device comprising a pair of substrates arranged in opposed relation to each other through a spacer and a liquid crystal held in a space between the substrates is produced by applying a spacer-forming material onto one of the pair of substrates by an ink-jet system to form the spacer, arranging the pair of substrates in opposed relation to each other with the spacer held therebetween, and enclosing a liquid crystal compound in the space between the pair of substrates.

3 Claims, 8 Drawing Sheets

LIQUID CRYSTAL ELEMENTAL DEVICE, PRODUCTION PROCESS THEREOF AND SPACER-BEARING SUBSTRATE

BACKGROUND OF THE INVENTION

1. Field of the Invention

The present invention relates to a liquid crystal elemental device production process. The device is suitable for use in color televisions, personal computers and the like. The invention also relates to a liquid crystal elemental device produced by the production process and a substrate which is a constituent member of the liquid crystal elemental device.

2. Related Background Art

With the advancement of personal computers, particularly, portable personal computers in recent years, the demand for color liquid crystal display devices has been increasing. It is, however, necessary to reduce the manufacturing cost of color liquid crystal display devices in order to make their use more widespread.

In a conventional production process of a liquid crystal elemental device, an elemental device for driving a liquid crystal, such as a TFT (thin film transistor), or an optical elemental device for coloring, such as a color filter, is provided on a pair of glass substrates which are transparent insulating substrates, and both transparent electrode and orientation film are then formed on each of the substrates. Spherical or cylindrical particles composed of silica, alumina, a synthetic resin or the like and having a particle diameter of about 3 to 10 $\mu$m are then dispersed as a spacer on the whole surface of one of the glass substrates on which the transparent electrode and orientation film have been formed. The pair of glass substrates are superimposed on each other through the spacer thus formed with the transparent electrodes opposed to each other, and a liquid crystal is enclosed in a space between the substrates, thereby producing a liquid crystal elemental device.

However, since a state of transmission/shading varies in effective pixel portions according to display condition, each spacer is observed as a bright point upon shading when the spacer is formed with a colorless, transparent material, or as a black point upon transmission when the spacer is colored black. This has caused problematic display quality deterioration.

In order to solve the above problem, there has been proposed a process in which an orientation film is subjected to an orientation treatment and then coated with a photosensitive polyimide or photoresist to conduct exposure through a mask, thereby forming spacers composed of the polyimide or photoresist at portions other than effective pixel portions as shown in Japanese Patent Application Laid-Open No. 61-173221, Japanese Patent Application Laid-Open No. 2-223922 or the like. According to this process, the spacer can be formed at arbitrary places with an arbitrary density, so that unevenness of cell gap in the liquid crystal elemental device when a liquid crystal is enclosed can be improved. Japanese Patent Application Laid-Open No. 3-94230 describes a process for fixing a spacer comprising beads on a shading layer in a region other than effective pixel portions.

Besides, there have been proposed methods in which a very thick black matrix is used as a spacer (Japanese Patent Application Laid-Open Nos. 63-237032, 3-184022 and 4-122914), in which an overlapped colored resist is used as a spacer (Japanese Patent Application Laid-Open No. 63-82405), and in which a colored pattern is also formed on a black matrix to use it as a spacer (Japanese Patent Application Laid-Open No. 63-237032).

All the methods proposed above are methods making use of photolithography and hence have involved problems in that an expensive exposure apparatus is required, and a production line is elongated due to the introduction of a wet process such as development.

In the above improving methods, it is necessary to directly apply the photosensitive polyimide or photoresist on to an orientation film formed of a polyimide film subjected to an orientation treatment by a rubbing process or the like and remove an unnecessary portion thereof with a solvent or the like after exposure. These steps may markedly contaminate or alter the state of orientation of the oriented film in some cases, and so there is a possibility that the orientation of a liquid crystal injected into a liquid crystal cell may be made uneven.

SUMMARY OF THE INVENTION

It is an object of the present invention to solve the above problems and provide a process for producing a liquid crystal elemental device free from the influence of a spacer on both effective pixel portions and non-effective pixel portions from the viewpoint of display and excellent in display quality without an increase in cost.

The above object can be achieved by the present invention described below.

According to the present invention, there is thus provided a process for producing a liquid crystal elemental device comprising a pair of substrates arranged in opposed relation to each other through a spacer and a liquid crystal held in a space between the substrates, which comprises the steps of applying a spacer-forming material onto one of the pair of substrates by an ink-jet system to form the spacer, arranging the pair of substrates in opposed relation to each other with the spacer held therebetween, and enclosing a liquid crystal compound in the space between the pair of substrates.

According to the present invention, there is also provided a process for producing a liquid crystal elemental device comprising a pair of substrates arranged in opposed relation to each other through a spacer and a liquid crystal held in a space between the substrates, which comprises the steps of applying a spacer-forming material a plurality of times to be built up onto one of the pair of substrates to form the spacer, arranging the pair of substrates in opposed relation to each other with the spacer held therebetween, and enclosing a liquid crystal compound in the space between the pair of substrates.

According to the present invention, there is further provided a process for producing a liquid crystal elemental device comprising a pair of substrates arranged in opposed relation to each other through a spacer and a liquid crystal held in a space between the substrates, which comprises the steps of applying a spacer-forming material onto one of the pair of substrates to form the spacer, flattening the top of the spacer, arranging the pair of substrates in opposed relation to each other with the spacer held therebetween, and enclosing a liquid crystal compound in the space between the pair of substrates.

According to the present invention, there is still further provided a process for producing a spacer-bearing substrate, which comprises the steps of forming a colored layer on a substrate, and applying a spacer-forming material by an ink-jet system to form a spacer.

According to the present invention, there is yet still further provided a process for producing a spacer-bearing substrate, which comprises the step of applying a spacer-forming material a plurality of times to be built up onto a substrate to form a spacer.

According to the present invention, there is yet still further provided a process for producing a spacer-bearing substrate, which comprises the steps of forming a spacer composed of a spacer-forming material on a substrate and flattening the top of the spacer.

DESCRIPTION OF THE PREFERRED EMBODIMENTS

Figure 1A:
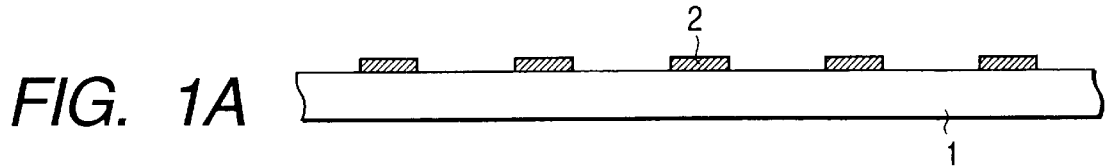
FIGS. 1A, 1B, 1C, 1D, 1E, 1F and 1G are flow charts illustrating a production process of a liquid crystal elemental device according to an embodiment of the present invention.
Figure 1B:
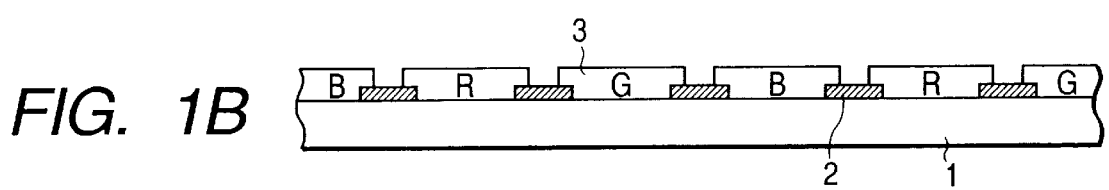
Figure 1C:
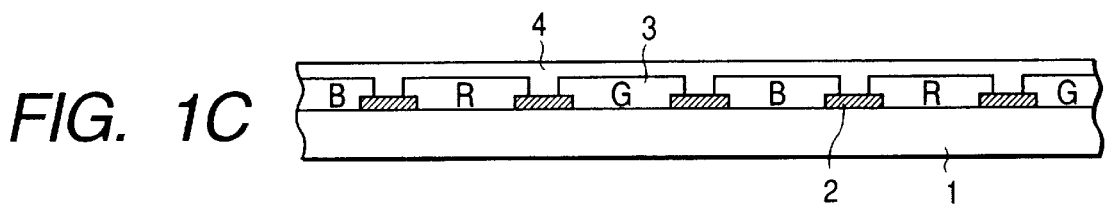
Figure 1D:
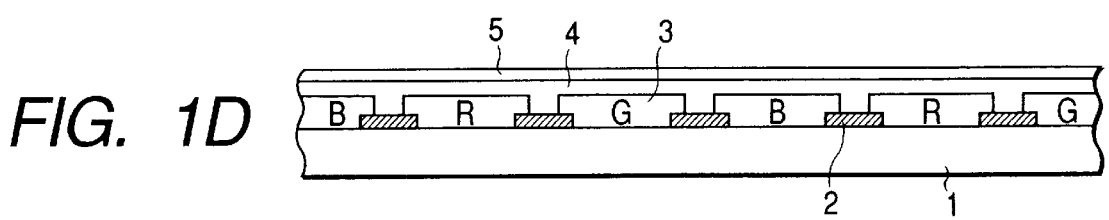
Figure 1E:
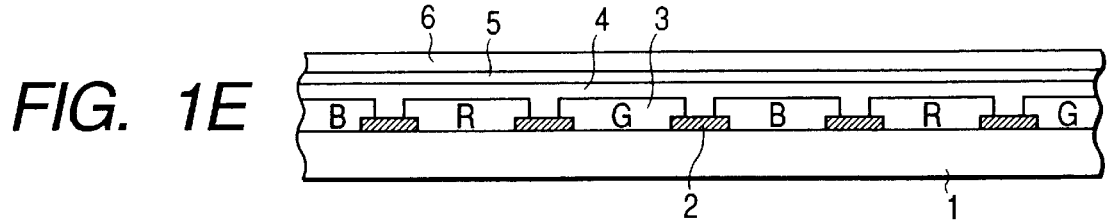

FIGS. 1A to 1G schematically illustrate steps of the formation of a spacer-bearing substrate in a production process of a liquid crystal elemental device according to an embodiment of the present invention. This embodiment is the case where one substrate is constituted by a color filter with a colored layer and a protective layer provided on a transparent substrate, and a spacer is formed on this substrate. In FIGS. 1A to 1G, reference numeral 1 indicates a transparent substrate, 2 a black matrix, 3 a colored layer, 4 a protective layer, 5 a transparent electrode, 6 an orientation film, 8 an ink-jet head, 9 a curable, spacer-forming material, and 10 a spacer. Incidentally, FIGS. 1A to 1G are schematic cross-sectional views corresponding to the following Steps (a) through (g), respectively.

In the following description, a system in which a spacer-forming material is ejected in place of an ink according to the conventionally known ink-jet system is referred to herein as the ink-jet system for the sake of convenience. The spacer-forming material means a material which will serve as a spacer after curing.

Step (a)

A black matrix 2 is formed on a transparent substrate 1 as needed. For the transparent substrate 1 in the present invention, a glass sheet is generally used. However, the substrate is not limited to the glass substrate so far as it has properties required of a liquid crystal elemental device, such as transparency and mechanical strength, and a plastic substrate may also be used.

No particular limitation is imposed on the black matrix 2, and any publicly known black matrix may be used. For example, the black matrix can be formed by etching a laminated film of a metal such as Cr or a metal oxide formed on the transparent substrate 1 in a pattern shape or by patterning a black resist coated on the transparent substrate 1.

Step (b)

A colored layer 3 composed of colored patterns of red (R), green (G) and blue (B) is formed on the transparent substrate. No particular limitation is imposed on a process for forming the colored layer 3 in the present invention, and any publicly known technique may be used. Examples thereof include a pigment dispersing process using photosetting resin compositions in which a pigment has been dispersed, a dyeing process comprising dyeing a resin film formed on a substrate with dyes, an electrodeposition process comprising electrodepositing colored compositions on an electroconductive substrate while energizing the substrate, thereby forming a colored layer, a printing process putting a printing technique into practice, and a thermal transfer process putting a thermal transfer technique into practice. A process making good use of an ink-jet system, by which a colored layer composed of 3 colored patterns can be formed at the same time by a single step, is desirable from the viewpoint of cost.

It is not always necessary to provide the colored layer 3 on a substrate on which a spacer 10 will be formed, and it is only necessary to form it on one of a pair of substrates making up a liquid crystal elemental device.

Step (c)

A protective layer 4 is formed as needed. For the protective layer 4, a resin layer capable of being cured by light irradiation, heat treatment or a combination thereof or an inorganic film formed by vapor deposition or sputtering may be used. However, any layer or film may be used so far as it has sufficient transparency to be used in a color filter and withstands a subsequent ITO film-forming step, orientated-film-forming step and the like.

Step (d)

A transparent electroconductive film (electrode) 5 is formed as needed. An ITO film formed by sputtering or the like is generally used for the transparent electroconductive film 5. However, the transparent electroconductive film 5 is not particularly limited to an ITO film, and a forming process thereof is also not limited in any way.

Step (e)

An orientation film 6 is formed in advance as needed. No particular limitation is imposed on the process and material for forming the orientation film 6, and any publicly known process and material may be used. The orientation film 6 may also be suitably subjected to a rubbing treatment by any publicly known method in advance.

Step (f)

The substrate is set into a spacer-writing machine to conduct substrate alignment utilizing alignment marks (not illustrated) used in the formation of the colored layer 3, thereby ejecting a curable, spacer-forming material 9 onto effective pixel portions by means of an ink-jet head.

The curable, spacer-forming material 9 will become a spacer after curing. For such a material, any material may be used so far as it contains a curable component and is capable of being ejected by means of an ink-jet head and being cured by a post treatment. The curable, spacer-forming material 9 preferably contains a homopolymer of one of such monomers as mentioned below or a copolymer of such a monomer with another vinyl monomer, and the content of such a polymer is 0.01 to 30% by weight, more preferably 0.1 to 15% by weight, particularly desirably 0.1 to 10% by weight.

Examples of the monomer which is a component of the polymer or copolymer contained in the curable, spacer-forming material 9 include N,N-dimethylol-acrylamide, N,N-dimethoxymethylacrylamide, N,N-diethoxymethylacrylamide, N,N-dimethylolmethacrylamide, N,N-dimethoxymethylmethacrylamide and N,N-diethoxymethylmethacrylamide. However, the monomers are not limited thereto. These monomers are used in the form of homopolymers or copolymers with other vinyl monomers. Examples of other vinyl monomers include acrylic acid, methacrylic acid, acrylic esters such as methyl acrylate and ethyl acrylate, methacrylic esters such as methyl methacrylate and ethyl methacrylate, hydroxyl group-containing vinyl monomers such as hydroxymethyl methacrylate, hydroxyethyl methacrylate, hydroxymethyl acrylate and hydroxyethyl acrylate, and besides styrene, a-methylstyrene, acrylamide, methacrylamide, acrilonitrile, allyamine, vinylamine, vinyl acetate and vinyl propionate.

The copolymerizing proportion, in terms of % by weight, of the above monomer to another vinyl monomer is preferably from 100%:0% to 5%:95%, particularly desirably from 90%:10% to 10%:90%.

When the curable, spacer-forming material is cured by light, various kinds of photosetting resins and photopolymerization initiators may be added thereto. In addition, various kinds of commercially available resins and additives may be added as other components so far as they do not cause problems such as crusting and the like in the curable, spacer-forming material. Specifically, acrylic resins, epoxy resins and the like are preferably used.

The respective components described above are mixed and dissolved in water and/or a publicly known solvent for the preparation of the curable, spacer-forming material. In this process, those known per se in the art may be used. Desirably, an additive solvent or an additive such as a surfactant is added according to the material (orientation film 6 in this embodiment) of the surface of the substrate, on which the spacer 10 is formed, to control the diameter of a dot formed by the curable, spacer-forming material 9 ejected, whereby the diameter of the spacer 10 can be controlled.

For the ink-jet system used in the present invention, a bubble-jet type making use of an electrothermal converter as an energy-generating element or a piezo-jet type making use of a piezoelectric element may be used. The shot-in quantity of the curable, spacer-forming material 9 may be arbitrarily preset. Although the shot-in position of the curable, spacer-forming material 9 may also be arbitrarily preset, it is preferably shot in at a position overlapping with the black matrix.

A cell gap in a liquid crystal elemental device is generally 2 to 10 µm. In the present invention also, a spacer having a height within this range is preferably formed.

The spacer may be formed only at positions necessary to hold a cell gap upon fabrication of a liquid crystal elemental device with a plurality of spacers dispersed in the form of a dot or line in the substrate. Each spacer is preferably formed in a substantially cylindrical shape.

Figure 2:
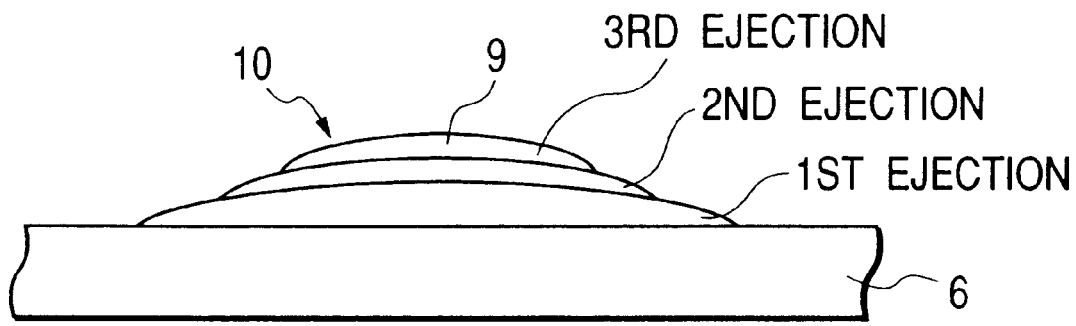
FIG. 2 illustrates how to form a spacer by ejecting a curable, spacer-forming material plural times.

In Step (f), the curable, spacer-forming material 9 may be ejected once to form the spacer 10. However, the curable, spacer-forming material 9 may be ejected plural times at the same position on the substrate by the ink-jet head 8 to overlap each other and build up as illustrated in FIG. 2, thereby forming the spacer 10. The reason for it is that when the curable, spacer-forming material 9 is ejected only once, the curable, spacer-forming material 9 may spread on the orientation film 6 to fail to achieve the height required as a spacer in some cases. Incidentally, when the curable, spacer-forming material 9 is ejected plural times at the same position as described above, the amount of the curable, spacer-forming material ejected later is lessened, or after the curable, spacer-forming material 9 ejected earlier is cured to some extent, the curable, spacer-forming material 9 is further ejected thereon, whereby the height necessary for the spacer is achieved with greater ease.

Figure 3:
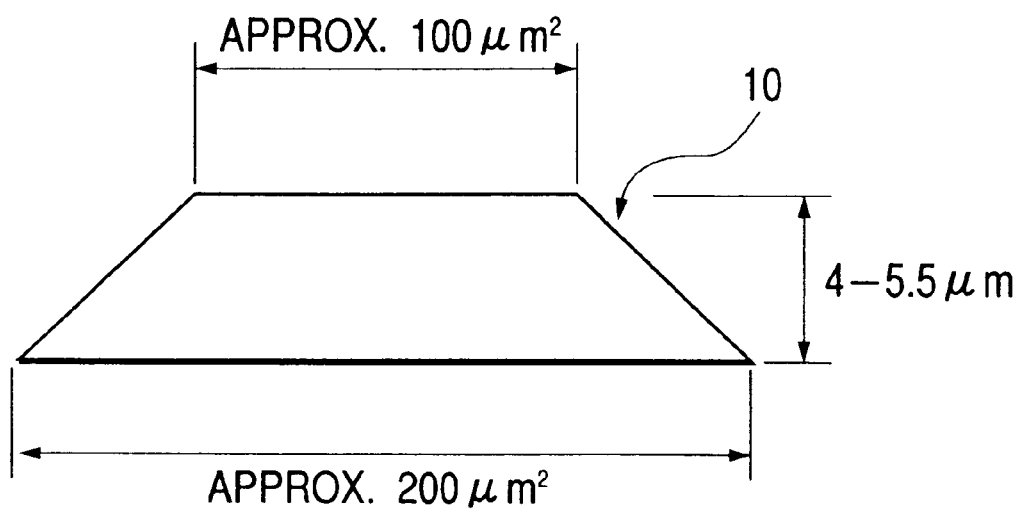
FIG. 3 illustrates an exemplary target shape of a spacer.

FIG. 3 is a sectional side elevation illustrating an exemplary target shape of a spacer. It is preferred from the viewpoint of achieving the height necessary for the spacer that the amount of the curable, spacer-forming material ejected later be lessened as illustrated in FIG. 2 to form the spacer into such a trapezoid as illustrated in FIG. 3.

Incidentally, the embodiment illustrated in FIG. 2 shows a case where the curable, spacer-forming material 9 is ejected 3 times at the same position on the substrate to form the spacer 10. However, the present invention is not limited to the three-fold ejection, but the spacer may be formed by two-fold ejection, four-fold ejection or more.

Step (g)

The curable, spacer-forming material 9 is cured by light irradiation, heat treatment or both light irradiation and heat treatment to form the spacer 10, thereby obtaining a spacer-bearing substrate according to the present invention. The light irradiation and heat treatment are conducted in accordance with the respective methods known per se in the art.

When the spacer requires specially strict evenness, the surface of the spacer 10 may be abraded and flattened according to the following Step (h). In this case, shavings remained after the abrasion are preferably cleaned off in the following Step (i).

Step (h)

If the top portion of the spacer 10 formed by the ink-jet system is round, an opposed substrate 11 (see FIG. 7) comes into point contact with the top of the spacer 10 when the opposed substrate 10 is bonded under pressure to the spacer-bearing substrate 20 through the spacer 10, so that it is difficult to control a gap length between both substrates. In addition, since the pressure is applied topically, the spacer 10 is easy to deform, thereby causing thickness irregularity of the gap between both substrates. Therefore, the top of the spacer 10 is necessary to be abraded in Step (h) to flatten it. When the top of the spacer 10 is flattened, the pressure is applied uniformly, so that the gap between both substrates can be controlled with high accuracy, thereby producing a liquid crystal display device which rarely causes display irregularity. Further, even when the shot-in quantity of the spacer-forming material for forming the spacer 10 varies, the height of the spacer 10 can be controlled precisely, and a yield can be enhanced.

In order to flatten the top of the spacer 10, methods such as cutting, hot pressing, tape abrading and buffing are considered, and buffing is most suitable. Incidentally, buffing refers to a method in which an abrasive is provided on the surface of an abrading base material, and a part to be abraded is brought into contact with the surface of the base material while rotating the abrading base material on its axis, thereby abrading the surface of the part.

Figure 4:
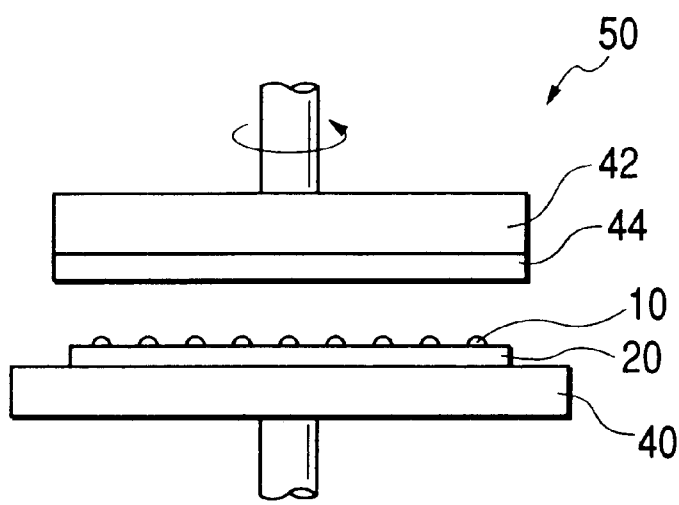
FIG. 4 illustrates the construction of an abrading device for abrading a spacer.

FIG. 4 illustrates the construction of an abrading device used for flattening the top of the spacer 10 by buffing.

The abrading device 10 is equipped with a lower holding part 40 that holds the spacer-bearing substrate 20 by suction and an upper holding part 42 opposed to the lower holding part 40. To the lower surface of the upper holding part 42 is attached an abrading member 44 with a finely particulate abrasive penetrated into an abrading base material. The upper holding part 42 is rotated on its axis in such a state that the abrading member 44 contacts the top of the spacer 10, whereby the top of the spacer 10 is flatly abraded. The lower holding part 40 is not rotatably driven, but is rotated with the rotation of the upper holding part 42.

As the abrading base material used in the abrading member 44, a nonwoven fabric, suede, porous body or the like is preferred. In this embodiment, the nonwoven fabric is used.

An inorganic oxide or the like is used as the abrasive, and an abrasive comprising alumina as a main component is preferred. The particle diameter thereof is preferably about 0.2 $\mu$m to 0.3 $\mu$m.

Figure 5:
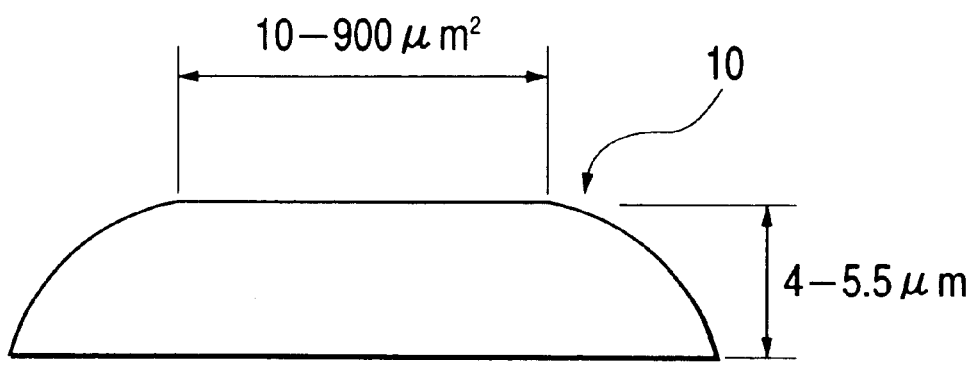
FIG. 5 illustrates another exemplary target shape of a spacer.

FIG. 5 illustrates another exemplary target shape of a spacer 10. As illustrated in FIG. 5, the top of the spacer 10 is preferably abraded into a flat surface having an average area of 10 to 900 $\mu m^2$, preferably 50 to 500 $\mu m^2$, more preferably 70 to 300 $\mu m^2$. If the surface area is smaller than 10 $\mu m^2$, the spacer 10 becomes easy to collapse, so that irregularity may occur in the gap between both substrates in some cases. If the surface area is greater than 900 $\mu m^2$, such a spacer may project from a shading region in some cases. The height of the spacer 10 varies according to a liquid crystal material used. However, in the case of a TN liquid crystal, the top of the spacer 10 is preferably abraded so as to give a height of 4 to 5.5 $\mu$m. The above numerical values can be inspected through an optical microscope.

Step (i)

The spacer-bearing substrate 20, the spacer 10 of which has been abraded in Step (h), is subjected to ultrasonic cleaning for removing shavings by the abrasion, and the like. The ultrasonic cleaning is conducted by, for example, immersing the spacer-bearing substrate 20 in an ultrasonic cleaning bath and applying a 100 kHz ultrasonic wave of 250 W for 1 minute.

Figure 6:
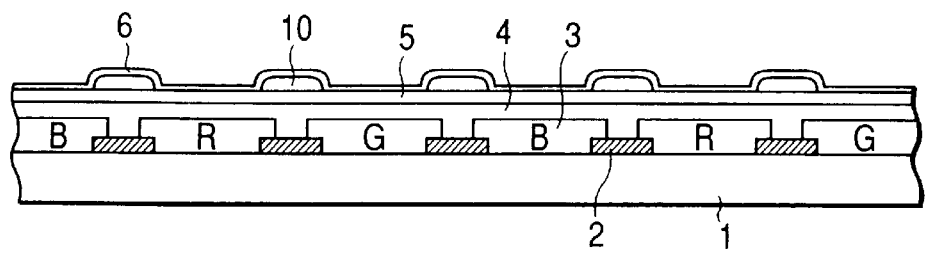
FIG. 6 is a schematic cross-sectional view illustrating a spacer-bearing substrate according to an embodiment of the present invention.

The orientation film 6 is not always required to be provided before the formation of the spacer 10, but may be provided after the formation of the spacer 10 as illustrated in FIG. 6.

The present invention is practiced by an ink-jet system making use of thermal energy as energy utilized for ejecting the spacer-forming material, whereby high density and high definition formation of the spacer can be achieved.

The typical construction and principle thereof preferably follow the basic principle disclosed in, for example, U.S. Pat. Nos. 4,723,129 and 4,740,796. This system may be applied to either the so-called on-demand type or continuous type. However, the on-demand type is particularly effective because at least one driving signal that responds to recording information and gives a rapid temperature rise beyond film boiling is applied to an electrothermal converter arranged in opposed relation to a sheet or liquid path in which a liquid (ink) is held, whereby thermal energy is generated by the electrothermal converter, thereby causing film boiling on a heat acting surface of a recording head, and consequently a bubble can be formed in the liquid (ink) in relation of 1:1 in response to the driving signal. The liquid (ink) is ejected through an opening for ejection by growth and shrinkage of the bubble to form at least one droplet. It is more preferred that the driving signal be applied in the form of a pulse, since the growth and shrinkage of the bubble are suitably conducted without delay, whereby the liquid (ink) can be ejected with excellent responsiveness in particular.

For the driving signal in the form of a pulse, those described in U.S. Pat. Nos. 4,463,359 and 4,345,262 are suitable. Incidentally, when the conditions described in U.S. Pat. No. 4,313,124 the invention of which relates to the rate of temperature rise on the heat acting surface, are adopted, excellent recording can be conducted.

For the construction of the recording head, besides such construction composed of a combination of an ejection orifice, a liquid path and an electrothermal converter as disclosed in the above-described respective U.S. patents (linear liquid path or right-angle liquid path), the construction disclosed in U.S. Pat. Nos. 4,558,333 and 4,459,600 that a heat acting surface is arranged in a curved region is also embraced in the present invention. In addition, the construction based on Japanese Patent Application Laid-Open No. 59-123670, disclosing the construction that a slot common to a plurality of electrothermal converters is used as an ejection part of the electrothermal converters, or Japanese Patent Application Laid-Open No. 59-138461, disclosing the construction that an opening absorbing the pressure wave of thermal energy is arranged in opposed relation to an ejection part may also be used.

Further, a full-line type recording head having a length corresponding to the width of the greatest recording medium on which recording can be conducted by a recording apparatus may be either the construction that the length is fulfilled by such a combination of plural recording heads as disclosed in the above-described U.S. patents or the construction as one recording head formed integrally.

Thereafter, the above-described spacer-bearing substrate and an opposed substrate fabricated separately are laminated with a sealant to fabricate a cell, and a liquid crystal is enclosed in the cell, thereby obtaining the liquid crystal elemental device according to the present invention.

Figure 7:
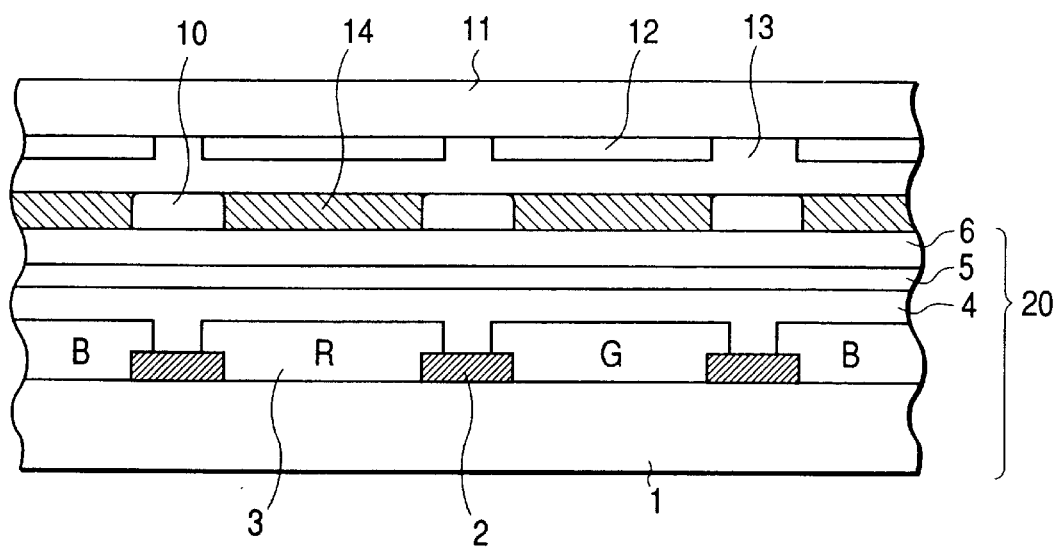
FIG. 7 is a schematic cross-sectional view illustrating a liquid crystal elemental device according to an embodiment of the present invention.
Figure 8:
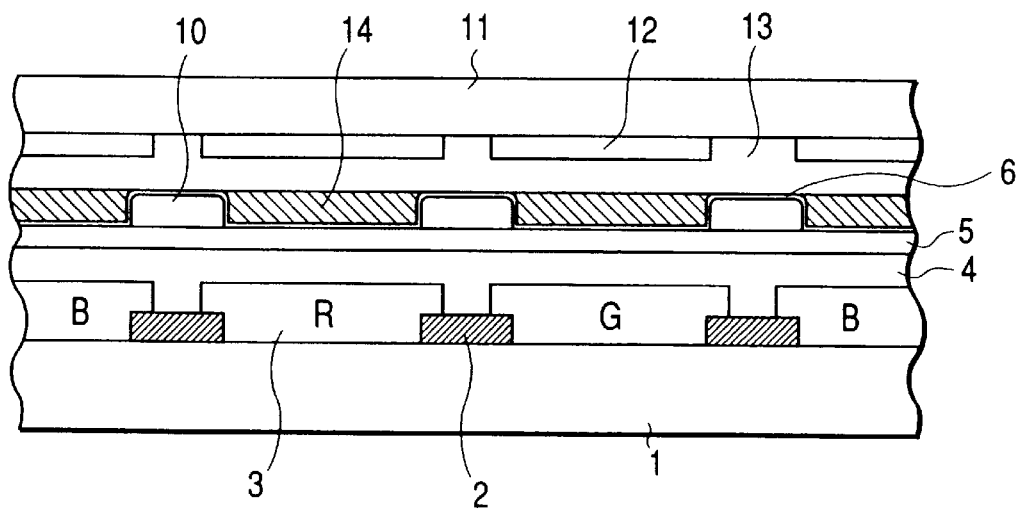
FIG. 8 is a schematic cross-sectional view illustrating a liquid crystal elemental device according to another embodiment of the present invention.

Examples of the liquid crystal elemental device according to the present invention are illustrated in FIGS. 7 and 8. FIG. 7 is a schematic cross-sectional view illustrating an exemplary liquid crystal elemental device fabricated using the spacer-bearing substrate according to the present invention illustrated in FIG. 1G. FIG. 8 is a schematic cross-sectional view illustrating an exemplary liquid crystal elemental device fabricated using the spacer-bearing substrate according to the present invention illustrated in FIG. 6. In FIGS. 7 and 8, reference numeral 11 indicates an opposed substrate, 12 pixel electrodes, 13 an orientation film, and 14 a liquid crystal. These liquid crystal elemental devices are examples of an active matrix type (so-called TFT type) liquid crystal elemental device in which a TFT (thin film transistor) is arranged for every pixel.

Liquid crystal elemental devices for colored display are generally formed by uniting the substrate 1 on the side of the color filter and the opposed substrate 11 and enclosing the liquid crystal 14 in a space between both substrates. On the inside of the opposed substrate 11, TFTs (not illustrated) and the transparent pixel electrodes 12 are formed in the form of a matrix. On the inside of the transparent substrate 1, the colored layer 3 of the color filter is provided in such a manner that colored portions of R, G and B are arranged at positions opposite to the pixel electrodes 12. The transparent electroconductive film (common electrode) 6 is formed onto the whole surface of the colored layer. The black matrix 2 is generally formed on the side of the color filter, but formed on the side of the opposed substrate 11 in a liquid crystal elemental device of the BM on array type. The orientation films 6 and 13 are further formed on the respective insides of both substrates. Liquid crystal molecules can be aligned or oriented in a fixed direction by subjecting these films to a rubbing treatment. These substrates are arranged in opposed relation to each other through the spacer 10 and laminated with a sealant (not illustrated). The liquid crystal 14 is filled in a space between both substrates. For the liquid crystal, any of a commonly used TN type liquid crystal, ferroelectric liquid crystal, etc. may be used.

In the case where the liquid crystal elemental device is of a transmission type, polarizing plates are arranged on the outsides of both substrates, and a back light generally composed of a combination of a fluorescent lamp and a scattering plate is used, or in the case where the liquid crystal elemental device is of a reflection type, a polarizing plate is arranged on the outside of the transparent substrate 1. In each case, the liquid crystal 14 functions as an optical shutter for changing the transmittance of light, thereby conducting display.

Although the TFT type liquid crystal elemental devices have been described in the above embodiments. However, the present invention is also preferably applied to liquid crystal elemental devices of other drive types such as the simple matrix type. The liquid crystal elemental devices according to the present invention are suitably used in both direct viewing type and projection type.

A spacer-forming material according to another embodiment will hereinafter be described.

A bead-containing spacer-forming material in which beads are dispersed in an adhesive may be used as the spacer-forming material.

The bead-containing spacer-forming material according to the present invention is formed in the spacer 10 by applying it onto the color filter and then curing the adhesive to fix the beads to the color filter.

For the bead-containing spacer-forming material according to the present invention, a ratio of the specific gravity of the beads to the specific gravity of the adhesive is 0.9 to 1.1, desirably 0.95 to 1.05 from the viewpoint of preventing the precipitation or flotation of the beads in the spacer-forming material.

For the beads contained in the bead-containing spacer-forming material according to the present invention, those having a particle diameter of 0.8 to 10 $\mu$m are preferably used from the viewpoint of holding a cell gap in the resulting liquid crystal elemental device, and they are contained in a proportion of preferably 0.1 to 50% by weight, more preferably 1 to 30% by weight in the spacer-forming material. Further, the viscosity of the adhesive is adjusted to preferably 2 to 100 cp, more preferably 3 to 50 cp at 25° C. from the viewpoint of successfully ejecting the spacer-forming material.

Preferably used as the beads used in the bead-containing spacer-forming material according to the present invention are porous bodies, nonporous bodies and hollow bodies of inorganic compounds such as glass, silica and metal oxides (MgO, $Al_2O_3$, etc.), and plastics such as polystyrene, polyethylene, polypropylene, polyesters, polyacrylics, nylons and silicone resins. In particular, beads of a porous material may be suitably selected, thereby conducting the adjustment of the specific gravity.

The adhesives used in the bead-containing spacer-forming material according to the present invention is cured after the bead-containing spacer-forming material is applied onto the color filter, so as to fix the beads, and a resin composition capable of curing by light irradiation, heat treatment or a combination thereof is preferably used. Specifically, the curable, spacer-forming material described above may be used.

For the ink-jet system used in the application of the bead-containing spacer-forming material, a piezo-jet type making use of a piezoelectric element, or the like may be preferably used. The shot-in position and shot-in quantity of the bead-containing spacer-forming material may be arbitrarily preset.

For the spacer-forming material 9, a material that contains a polymer, copolymer or monomer component as a component curable by light irradiation or heat treatment and that is prepared at a high concentration in which the content of a solvent component is not higher than 50% by weight may be used. The solvent component contained in the spacer-forming material 9 is lessened to prepare a high concentration material as described above, whereby the sufficient height of a droplet required for the spacer can be achieved upon application of the spacer-forming material onto the color filter by an inkjet head, and so a spacer having a sufficient height can be formed in a narrow area. Accordingly, a spacer having a desired height can be selectively formed only over a black matrix 2 having a narrow width with ease.

The content of the solvent component is preferably not higher than 30% by weight, more preferably not higher than 20% by weight, and is not lower than 5% by weight.

A specific component contained in the spacer-forming material 9 includes an acrylic resin, epoxy resin or the like. However, a component by which the viscosity of the spacer-forming material does not become very high is preferred taking its ejectability by the ink-jet system into consideration, and so a monomer or oligomer material curable by light irradiation or heat treatment is preferred. Specifically, monomers or oligomers having at least two ethylenically unsaturated bonds, monomers or oligomers having at least two glycidyl groups, and the like are included. However, such components are not limited thereto.

When the spacer-forming material is cured by light, various kinds of photosetting resins and photopolymerization initiators may be added thereto. In addition, various kinds of commercially available resins and additives may be added as other components so far as they do not cause problems such as crusting and the like in the spacer-forming material.

The respective components described above are mixed and dissolved in water and/or a publicly known solvent when preparing the spacer-forming material 9. In this process, those known per se in the art may be used. Desirably, an additive solvent or an additive such as a surfactant is added according to the material of the surface, on which the spacer 10 is formed, to control the diameter of a dot formed by the spacer-forming material 9 ejected, whereby the diameter of the spacer 10 can be controlled.

A preferable embodiment of a production process of a spacer-bearing color filter, in which a colored layer of the color filter is formed by an ink-jet system, will hereinafter be described with reference to FIGS. 9A to 9G.

Incidentally, FIGS. 9A to 9G correspond to the following Steps (a) to (g), respectively.

Step (a)

A black matrix 2 is formed as a shading layer having apertures on a transparent substrate 1, and an ink-receiving layer 53 composed of a resin composition is formed on the whole surface thereof The ink-receiving layer 53 is composed of a resin composition curable by light irradiation, heat treatment, or both light irradiation and heat treatment and has ink absorbency. Particularly preferably, the ink-receiving layer 53 is formed by a photosensitive resin composition, the ink absorbency of which is increased or decreased by light irradiation, to form non-coloring portions 55 between adjacent coloring portions 56 by patterning exposure which will be described subsequently, thereby preventing color mixing. For such a photosensitive resin composition, an acrylic resin, epoxy resin, amide resin, phenol resin, polystyrene resin or the like is used in combination wit h a photo-initiator (crosslinking agent) as needed. This embodiment is a case where a negative type photosensitive resin composition, the ink absorbency of which is lowered by light irradiation, is used.

The photosensitive resin composition is applied onto the transparent substrate 1 by a publicly known means such as spin coating, dip coating, roll coating, bar coating or slit coating and prebaked as needed, thereby forming the ink-receiving layer 53.

Incidentally, the ink-receiving layer 53 is preferably such that the ink absorbency is increased or decreased by light irradiation, and at the same time the wettability by ink is also increased or decreased.

Step (b)

Patterning exposure is conducted through a photomask 54 to form the coloring portions 56 having high ink absorbency and non-coloring portions 55, the ink absorbency of which is lower (or lost) than that of the coloring portions 56. In this embodiment, the photosensitivity of the ink-receiving layer 53 is negative, and in this case, a photomask having such an opening pattern that the width of each of the non-coloring portions 55 becomes narrower than the width of the black matrix 2 is preferably used from the viewpoint of forming colored portions 59 wider than the aperture of the black matrix 2 to prevent color skip at aperture portions of the black matrix 2.

In the case where the photosensitivity of the ink-receiving layer 53 is positive, the black matrix 2 is used as a photomask to conduct exposure from the back side of the transparent substrate 1, whereby the patterning exposure can be conducted without using any photomask.

Step (c)

Color inks 58 of R (red), G (green) and B (blue) colors are applied to the coloring portions 56 of the ink-receiving layer according to the prescribed coloring pattern by means of an ink-jet head 57. In this embodiment, the non-coloring portions 55 low (or lost) in ink absorbency are interposed between adjacent coloring portions 56, so that the respective inks overflowed from the coloring portions 56 are repelled by the non-coloring portions 55, thereby preventing color mixing between the adjacent coloring portions 56.

For the color inks used in the present invention, both dye inks and pigment inks may be used, and any inks may be used so far as they can be ejected by an ink-jet system.

For the ink-jet system used in the present invention, a bubble-jet type using an electrothermal converter as an energy-generating element, a piezo-jet type making use of a piezoelectric element, or the like may be used. A coloring area and a coloring pattern may be arbitrarily preset.

Step (d)

After the color inks 58 are absorbed in the respective coloring portions 56 and sufficiently diffused, the ink-receiving layer is subjected to a drying treatment as needed, and the whole surface of the ink-receiving layer is subjected to a necessary treatment such as light irradiation and/or heat treatment to cure the whole ink-receiving layer to form a colored layer composed of the non-coloring portions 55 and the colored portions 59.

Step (e)

After a protective layer 4 is formed as needed, a transparent electroconductive film 5 which will become an electrode for driving a liquid crystal is formed.

For the transparent electroconductive film 5, ITO (indium-tin-oxide) film is generally used. Such a film can be formed by sputtering or the like.

Step (f)

A spacer-forming material 9 is partially applied in, preferably, a region overlapping with the black matrix 2 by an ink-jet head 8.

Step (g)

The spacer-forming material 9 is subjected to a necessary treatment such as light irradiation, heat treatment or both light irradiation and heat treatment to cure the spacer-forming material 9, thereby forming the spacer 10 to obtain a spacer-bearing color filter according to the present invention. The light irradiation and heat treatment are conducted in accordance with the respective methods known per se in the art.

FIGS. 11A to 11F illustrate steps of a production process of a spacer-bearing color filter according to another embodiment of the present invention. In FIGS. 11A to 11F, like reference numerals are given to the same members as in FIGS. 9A to 9G, and their descriptions are omitted. In FIGS. 11A to 11F, reference numeral 32 indicates a black matrix, 57 an ink-jet head, 38 curable color inks, and 39 colored portions. Incidentally, FIGS. 11A to 11F correspond to the following Steps (a) to (f), respectively.

Step (a)

A black matrix 32 having apertures is formed with a black resin composition on a transparent substrate 1. The black matrix 32 has a function as a partition wall for preventing color mixing between curable color inks 38 used for forming colored portions 39.

For such a black resin composition, a composition having photosensitivity is preferred. Specifically, an acrylic resin, epoxy resin, amide resin, phenol resin, polystyrene resin or the like is used in combination with a photo-initiator (crosslinking agent) as needed, and a black dye or pigment is mixed therewith before use.

After the photosensitive black resin composition is applied on to the transparent substrate 1 by a publicly known means such as spin coating, dip coating, roll coating, bar coating or slit coating and prebaked as needed, patterning exposure and development are conducted to obtain the black matrix 32 having prescribed pattern.

Step (b)

Curable color inks 38 are applied to the apertures of the black matrix 32. For the curable color inks 38, colored resin compositions comprising a resin curable by application of energy, such as light irradiation or heat treatment, and a dye or pigment of R, G or B color are used. A melamine resin; a hydroxyl group- or carboxyl group-containing polymer and melamine; a hydroxyl group- or carboxyl group-containing polymer and a polyfunctional epoxy compound; a hydroxyl group- or carboxyl group-containing polymer and a reactive cellulose compound; an epoxy resin and a resol resin; an epoxy resin and an amine; an epoxy resin and a carboxylic acid or an acid anhydride; an epoxy compounds; or a negative resist may be used for the resin.

For the ink-jet system, a bubble-jet type using an electrothermal converter as an energy-generating element, a piezo-jet type making use of a piezoelectric element, or the like may be used as in the application of the color inks in the above embodiment. A coloring pattern may be arbitrarily preset.

Step (c)

The inks applied are subjected to a drying treatment as needed, and then a necessary treatment such as light irradiation and/or heat treatment to cure the curable color inks 38, thereby forming colored portions 39. In this embodiment, the colored portions 39 correspond to the colored layer of the color filter.

Step (d)

Figure 9A:
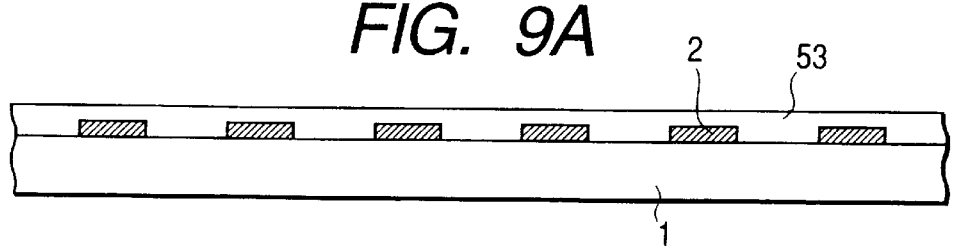
FIGS. 9A, 9B, 9C, 9D, 9E, 9F and 9G are flow charts illustrating a production process of a liquid crystal elemental device according to another embodiment of the present invention.
Figure 9B:
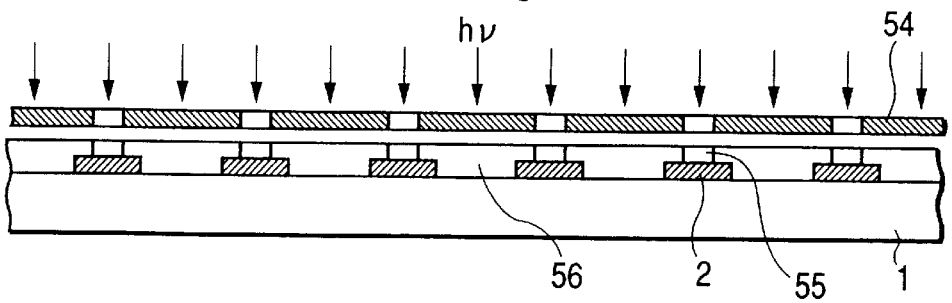
Figure 9C:
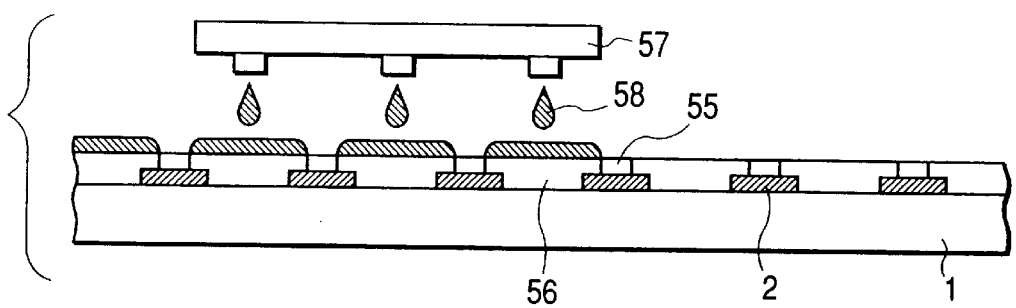
Figure 9D:
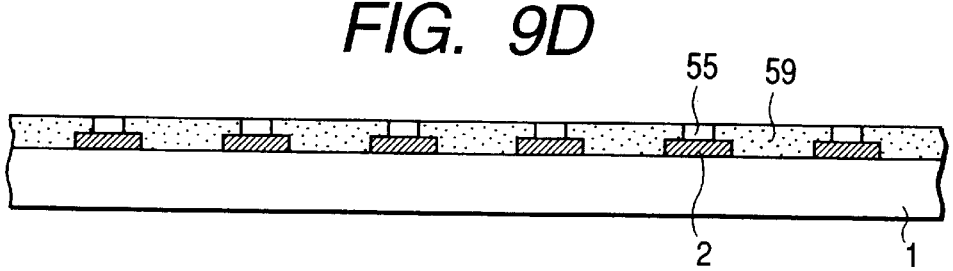
Figure 9E:
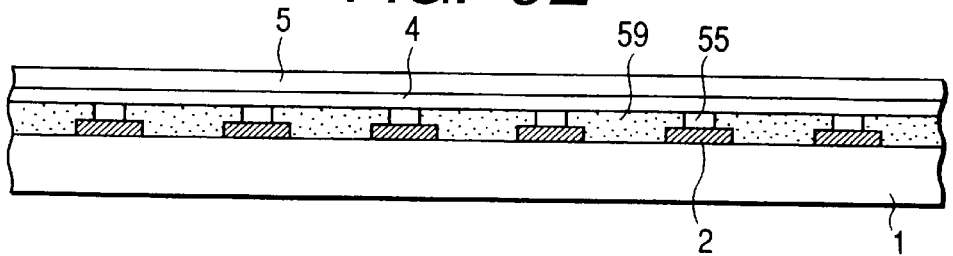

After a protective layer 4 is formed as needed as in FIG. 9E, a transparent electroconductive film 5 is formed.

Step (e)

Figure 9F:
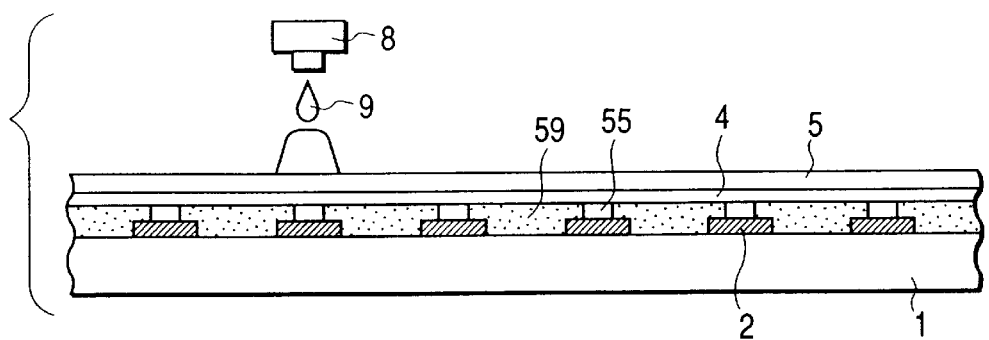

As with FIG. 9F, a spacer-forming material 9 is partially applied in, preferably, a region overlapping with the black matrix 2 by an ink-jet head 8.

Step (f)

Figure 9G:
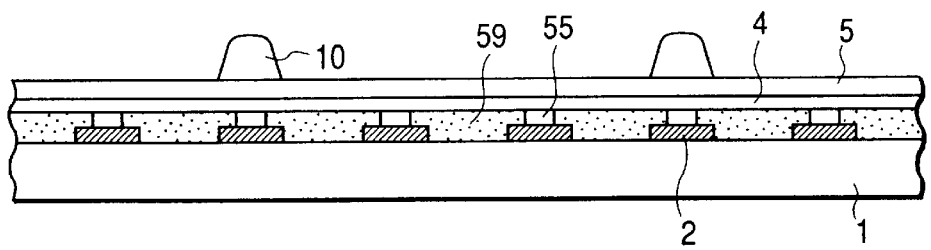

The spacer-forming material 9 is subjected to a necessary treatment in the same manner as in FIG. 9G to cure the spacer-forming material 9, thereby forming the spacer 10 to obtain a spacer-bearing color filter according to the present invention.

Figure 12:
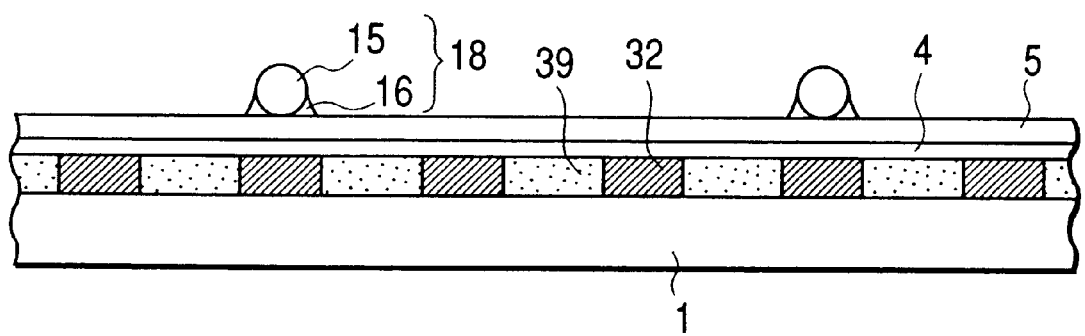
FIG. 12 is a schematic cross-sectional view illustrating a spacer-bearing substrate according to another embodiment of the present invention.

FIG. 12 schematically illustrates an exemplary spacer-bearing color filter in which a spacer 18 has been formed with a bead-containing spacer-forming material. According to this spacer 18, beads 15 are fixed to a transparent electroconductive film 5 with an adhesive 16.

Figure 10:
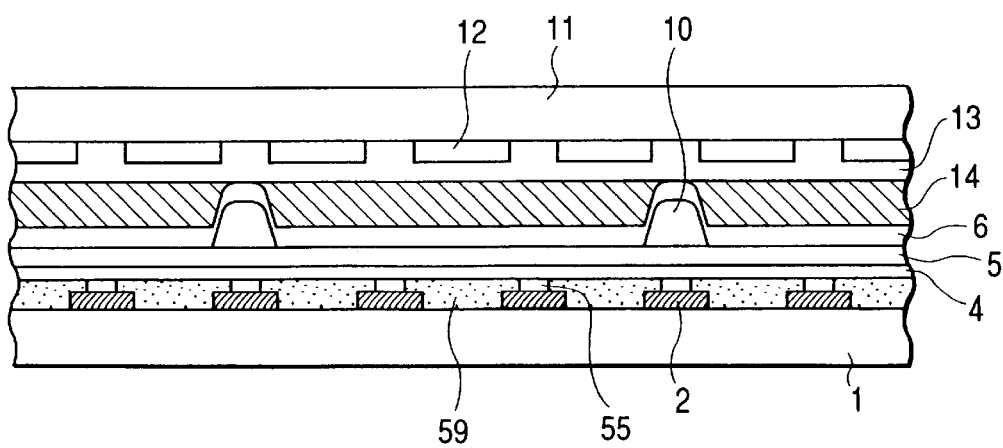
FIG. 10 is a schematic cross-sectional view illustrating a liquid crystal elemental device according to a further embodiment of the present invention.
Figure 11A:
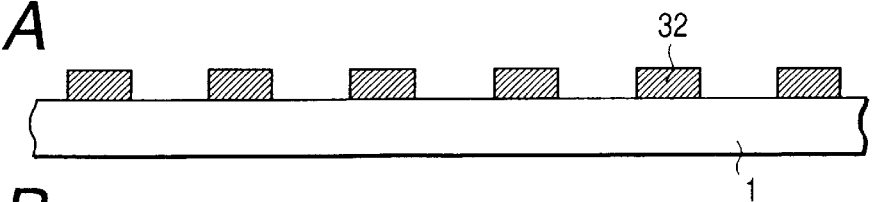
FIGS. 11A, 11B, 11C, 11D, 11E and 11F are flow charts illustrating a production process of a liquid crystal elemental device according to a further embodiment of the present invention.
Figure 11B:
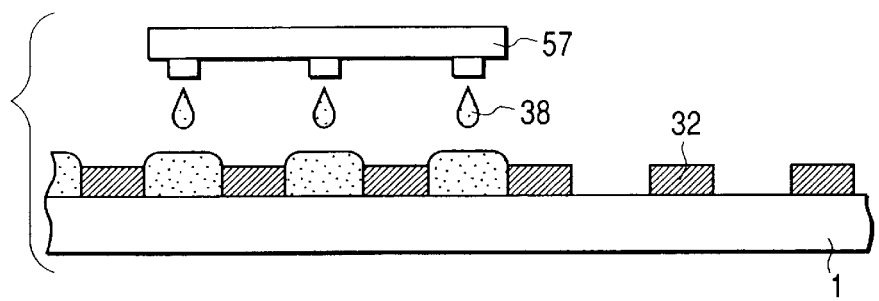
Figure 11C:
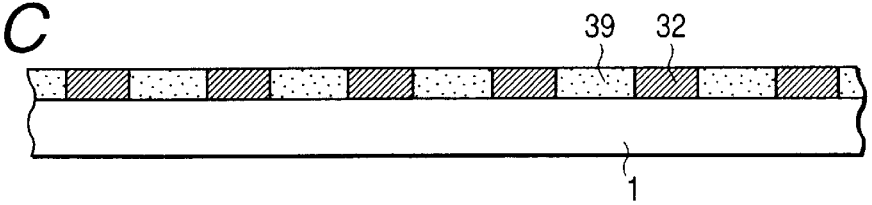
Figure 11D:
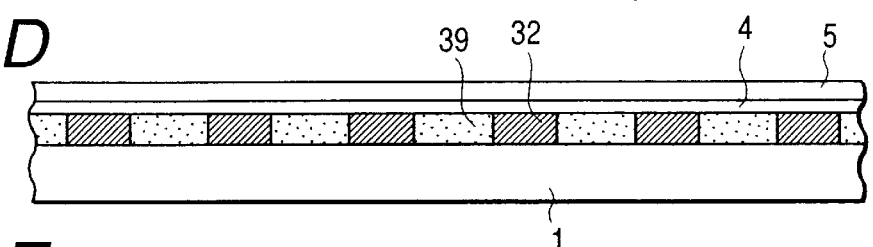
Figure 11E:
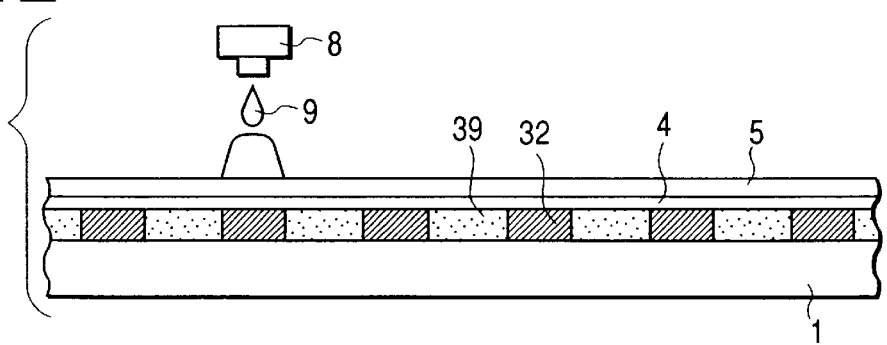
Figure 11F:
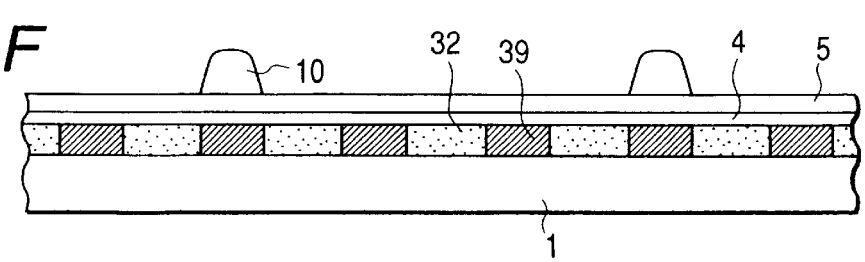

FIG. 10 is a schematic cross-sectional view illustrating an exemplary liquid crystal elemental device using the spacer-bearing color filter according to the present invention.

A spacer-forming material of a positive or negative type photosensitive resin composition is applied onto the color filter, and then the spacer-forming material which has spread too much is then subjected to patterning exposure and developed, whereby an unnecessary portion of the spacer may be removed. According to this process, a spacer having a proper size can be formed.

The present invention will hereinafter be described more specifically by the following EXAMPLEs.

EXAMPLE 1

Figure 1F:
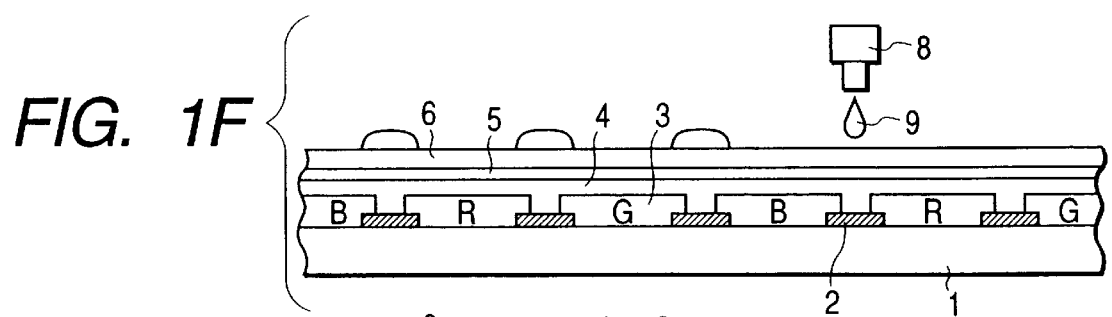
Figure 1G:
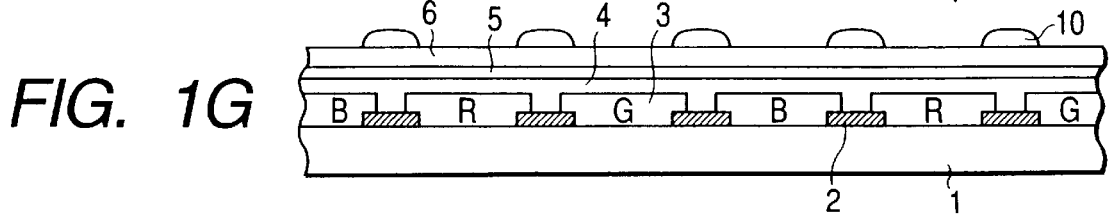

A metal chromium film having a thickness of 0.1 $\mu$m was formed on a glass substrate by sputtering and etched using a photoresist, thereby obtaining a lattice black matrix. Thereafter, a colored layer composed of colored patterns of R, G and B was formed using a publicly known process for forming a color filter by an ink-jet system. A protective layer composed of an acrylic resin was formed thereon by means of a spin coater to conduct smoothing. An ITO film as a transparent electrode was further formed thereon by sputtering, and an orientation film composed of polyimide was further formed thereon. A curable, spacer-forming material having the following composition was ejected onto the black matrix of this substrate by an ink-jet head as illustrated in FIG. 1F.

Composition of curable, spacer-forming material:

| Copolymer | 10% by weight |
|---|---|
| Water | 80% by weight |
| Ethylene glycol | 10% by weight |

The copolymer used in the above composition was a bipolymer of N,N-dimethylolacrylamide and methyl methacrylate (copolymerization ratio=40:60 by weight).

The above-prepared substrate was heated at 100° C. for 15 minutes and then at 200° C. for 30 minutes to cure the curable, spacer-forming material, thereby forming a spacer.

The substrate on which the spacer had been formed and a substrate on which opposed electrodes had been formed were laminated with a sealant to fabricate a cell. A liquid crystal was filled into the cell to obtain a liquid crystal elemental device according to the present invention. The liquid crystal elemental device thus obtained exhibited less color irregularity and excellent contrast, as compared with a conventional liquid crystal elemental device in which spacers having a diameter of 6 $\mu$m are dispersed.

EXAMPLE 2

A metal chromium film having a thickness of 0.1 $\mu$m was formed on a glass substrate by sputtering and etched using a photoresist, thereby obtaining a lattice black matrix. Thereafter, a colored layer composed of colored patterns of R, G and B was formed using a publicly known process for forming a color filter by an ink-jet system. A protective layer composed of an acrylic resin was formed thereon by means of a spin coater to conduct smoothing. An ITO film as a transparent electrode was further formed thereon by sputtering. A curable, spacer-forming material having the following composition was ejected onto the black matrix of this substrate by an ink-jet head in the same manner as in EXAMPLE 1. Incidentally, an orientation film composed of polyimide was formed after the formation of the spacer.

Composition of curable, spacer-forming material:

| Copolymer | 10% by weight |
|---|---|
| Water | 80% by weight |
| Ethylene glycol | 10% by weight |

The copolymer used in the above composition was a bipolymer of N,N-dimethylolacrylamide and methyl methacrylate (copolymerization ratio=40:60 by weight).

In this example, the curable, spacer-forming material was ejected 3 times to form the spacer. In this case, the spacer-forming material was ejected on the substrate in an amount of 20 ng for the first ejection, 15 ng for the second ejection and 10 ng for the third ejection, thereby forming a spacer in a substantially trapezoidal form as illustrated in FIG. 3.

The above-prepared substrate was heated at 100° C. for 15 minutes and then at 200° C. for 30 minutes to cure the curable, spacer-forming material, thereby forming the spacer. The spacer had a thickness of 5 $\mu$m and a diameter of about 20 $\mu$m.

The substrate on which the spacer had been formed and a substrate on which opposed electrodes had been formed were laminated with a sealant to fabricate a cell. A liquid crystal was filled into the cell to obtain a liquid crystal elemental device according to the present invention. The liquid crystal elemental device thus obtained exhibited less color irregularity and excellent contrast, as compared with a conventional liquid crystal elemental device in which spacers having a diameter of 6 $\mu$m are dispersed.

EXAMPLE 3

A metal chromium film having a thickness of 0.1 $\mu$m was formed on a glass substrate by sputtering and etched using a photoresist, thereby obtaining a lattice black matrix. Thereafter, a colored layer composed of colored patterns of R, G and B was formed using a publicly known process for forming a color filter by an ink-jet system. A protective layer composed of an acrylic resin was formed thereon by means of a spin coater to conduct smoothing. An ITO film as a transparent electrode was further formed thereon by sputtering. A curable, spacer-forming material having the following composition was ejected onto this substrate at a position opposed to each element of the black matrix by an ink-jet head. In this example, an ink-jet head that can eject the spacer-forming material in a larger amount than the ink-jet head used in EXAMPLE 1 was used.

Composition of curable, spacer-forming material:

| | |
|---|---|
| Copolymer | 10% by weight |
| Water | 80% by weight |
| Ethylene glycol | 10% by weight |

The copolymer used in the above composition was a bipolymer of N,N-dimethylolacrylamide and methyl methacrylate (copolymerization ratio=40:60 by weight).

The above-prepared substrate was heated at 100° C. for 15 minutes and then at 200° C. for 30 minutes to cure the curable, spacer-forming material, thereby forming a spacer.

The top of the cured spacer was then abraded by such an abrading device as illustrated in FIG. 4, thereby flattening the top into a flat surface having an average area of about 100 $\mu m^2$. The height of the spacer was controlled to 5 $\mu m$.

The spacer-bearing substrate, the spacer of which had been abraded, was immersed in an ultrasonic cleaning bath to apply an ultrasonic wave of 100 kHz and 250 W for 1 minute thereto, thereby cleaning the substrate. An orientation film was further formed thereon, followed by baking and a rubbing treatment.

The substrate on which the spacer had been formed and a substrate on which opposed electrodes had been formed were laminated with a sealant to fabricate a cell. A liquid crystal was filled into the cell to obtain a liquid crystal elemental device according to the present invention. The liquid crystal elemental device thus obtained exhibited less color irregularity and excellent contrast, as compared with a conventional liquid crystal elemental device in which spacers having a diameter of 6 $\mu m$ are dispersed.

EXAMPLE 4

A resin composition comprising 97 parts by weight of an acrylic terpolymer having the following composition and 3 parts by weight of triphenylsulfonium hexafluoroantimonate dissolved in ethyl cellosolve was applied onto a glass substrate, on which a lattice black matrix (aperture size: 60 $\mu m \times 150 \mu m$) having a width of 20 $\mu m$ and a length of 35 $\mu m$ had been formed with chromium by spin coating so as to give a film thickness of 2 $\mu m$, followed by prebaking at 90° C. for 20 minutes, thereby forming an ink-receiving layer.

Composition of acrylic terpolymer:

| | |
|---|---|
| methyl methacrylate | 50 parts by weight |
| hydroxyethyl methacrylate | 30 parts by weight |
| N-methylolacrylamide | 20 parts by weight |

The ink-receiving layer was subjected to patterning exposure in stripe form at part of the ink-receiving layer on the black matrix through a photomask having stripe openings, each having a width narrower than that of the black matrix, and then subjected to a heat treatment for 1 minute on a hot plate heated to 120° C. Dye inks of R (red), G (green) and B (blue) colors were applied to unexposed portions of the ink-receiving layer by means of an ink-jet recording apparatus, thereby coloring the ink-receiving layer in stripe form with continuous dots. The inks were then dried at 90° C. for 5 minutes. The substrates thus colored were subsequently subjected to a heat treatment at 200° C. for 60 minutes to cure the whole ink-receiving layer, thereby obtaining a colored layer.

A two-pack type thermosetting resin composition ("SS6699G", trade name, product of JSR Co., Ltd.) was spin coated on the colored layer so as to give a film thickness of 1 $\mu m$ and prebaked at 90° C. for 30 minutes. The thus-formed film was heat treated at 250° C. for 60 minutes to form a protective layer. An ITO film was then formed by sputtering so as to give a thickness of 1,500 Å, thereby obtaining a color filter.

Beads (divinylbenzene-crosslinked polystyrene; specific gravity: 1.02) having a particle diameter of 5.5 $\mu m$ were dispersed in an adhesive (specific gravity: 0.98) composed of 10% by weight of a bipolymer of N,N-dimethylolacrylamide and methyl methacrylate (weight ratio=40:60), 80% by weight of water and 10% by weight of ethylene glycol in such a manner that the content of the beads in a spacer-forming material was 10% by weight, thereby preparing a bead-containing spacer-forming material. The viscosity of this spacer-forming material was 19 cp at 25° C. The bead-containing spacer-forming material was applied onto the ITO film by an ink-jet head in such a manner that the beads were partially arranged in a region overlapping with the black matrix. The beads were uniformly dispersed in the spacer-forming material in this application step and have been applied to desired positions on the black matrix. The thus-treated substrate was subjected to an additional heat treatment at 150° C. for 20 minutes to cure the adhesive, thereby fixing the beads to the ITO film to obtain a spacer-bearing color filter.

The spacer-bearing color filter thus obtained was used to fabricate a liquid crystal elemental device for color display. As a result, a good color image was displayed.

EXAMPLE 5

A resin composition comprising 97 parts by weight of an acrylic terpolymer having the following composition and 3 parts by weight of triphenylsulfonium hexafluoroantimonate dissolved in ethyl cellosolve was applied onto a glass substrate, on which a lattice black matrix (aperture size: 100 $\mu m \times 300 \mu m$) having a width of 20 $\mu m$ and a length of 40 $\mu m$ had been formed with chromium by spin coating so as to give a film thickness of 2 $\mu m$ and prebaked at 90° C. for 20 minutes, thereby forming an ink-receiving layer.

Composition of acrylic terpolymer:

| | |
|---|---|
| methyl methacrylate | 50 parts by weight |
| hydroxyethyl methacrylate | 30 parts by weight |
| N-methylolacrylamide | 20 parts by weight |

The ink-receiving layer was subjected to patterning exposure in stripe form at part of the ink-receiving layer on the black matrix through a photomask having stripe openings, each having a width narrower than that of the black matrix, and then subjected to a heat treatment for 1 minute on a hot plate heated to 120° C. Dye inks of R (red), G (green) and 8 (blue) colors were applied to unexposed portions of the ink-receiving layer by means of an ink-jet recording apparatus, thereby coloring the ink-receiving layer in stripe form with continuous dots. The inks were then dried at 90° C. for 5 minutes. The substrates thus colored were subsequently subjected to a heat treatment at 200° C. for 60 minutes to cure the whole ink-receiving layer, thereby obtaining a colored layer.

A two-pack type thermosetting resin composition ("SS 6699G", trade name, product of JSR Co., Ltd.) was spin coated on the colored layer so as to give a film thickness of 1 μm and prebaked at 90° C. for 30 minutes. The thus-formed film was heat treated at 250° C. for 60 minutes to form a protective layer. An ITO film was then formed by sputtering so as to give a thickness of 150 nm, thereby obtaining a color filter.

A spacer-forming material having the following composition was applied in an amount of 5 pl per position onto the color filter thus obtained in a region overlapping with the black matrix by an ink-jet system. The spacer-forming material thus applied was subjected to a heat treatment to cure.

Composition of curable, spacer-forming material:

| | |
|---|---|
| Polypropylene/glycol diglycidyl ether ("EX-920", product of Nagase Chemicals, Ltd.) | 80% by weight |
| Water | 20% by weight |

The spacer thus obtained was in a substantially cylindrical form having a diameter of 20 μm and a height of 5 μm.

The spacer-bearing color filter thus obtained was used to fabricate a liquid crystal elemental device. As a result, no influence of the spacer on display was exerted, and so a good display was realized.

What is claimed is:

1. A process for producing a liquid crystal elemental device comprising a pair of substrates arranged in opposed relation to each other through a spacer and a liquid crystal held in a space between the substrates, said process comprising the steps of:

applying a spacer-forming material onto one of the pair of substrates by an ink-jet system to form the spacer, arranging the pair of substrates in opposed relation to each other with the spacer held therebetween, and enclosing a liquid crystal compound in the space between the pair of substrates, wherein the spacer-forming material comprises an adhesive and beads dispersed in the adhesive, and wherein a ratio of the specific gravity of the beads to the specific gravity of the adhesive is 0.9 to 1.1.

2. A process for producing a liquid crystal elemental device comprising a pair of substrates arranged in opposed relation to each other through a spacer and a liquid crystal held in a space between the substrates, said process comprising the steps of:

applying a spacer-forming material onto one of the pair of substrates by an ink-jet system to form the spacer, arranging the pair of substrates in opposed relation to each other with the spacer held therebetween, and enclosing a liquid crystal compound in the space between the pair of substrates, wherein the spacer-forming material comprises an adhesive and beads dispersed in the adhesive, and wherein the beads have a particle diameter of 0.8 to 10 μm, and the adhesive has a viscosity of 2 to 100 cp at 25° C.

3. A process for producing a liquid crystal elemental device comprising a pair of substrates arranged in opposed relation to each other through a spacer and a liquid crystal held in a space between the substrates, said process comprising the steps of:

applying a spacer-forming material onto one of the pair of substrates by an ink-jet system to form the spacer, arranging the pair of substrates in opposed relation to each other with the spacer held therebetween, and enclosing a liquid crystal compound in the space between the pair of substrates, wherein the spacer-forming material comprises a curable component curable by light or heat and a solvent component, and the content of the solvent component is at most 50% by weight.

* * * * *